2,752,380
DEHYDROCHLORINATION OF CHLOROALKYL-CHLOROSILANES

George H. Wagner, Kenmore, and Arthur N. Pines, Snyder, N. Y., assignors to Union Carbide and Carbon Corporation, a corporation of New York No Drawing. Application December 18, 1952, Serial No. 326,784

14 Claims. (Cl. 260—448.2)

This invention relates to a process for treating chloroalkyl chlorosilanes. More particularly, the invention is concerned with the dehydrochlorination of chloroalkyl chlorosilanes containing a single silicon atom whereby there is provided a new process of preparing unsaturated derivatives of such compounds.

Chloroalkyl chlorosilanes which comprise the starting compounds of the present invention may be prepared by any of the known processes in the art. For example, many of the compounds may be obtained by subjecting an alkyl chlorosilane to the action of chlorine gas under ultraviolet light. Such compounds may also be obtained from side reactions occurring in various chlorine-silicon syntheses.

We have found that the removal of HCl from the respective chlorinated derivatives can be effected by heating the compounds to their boiling temperatures under conditions of partial reflux or at temperatures below the boiling temperature in the presence of an aluminum chloride or an aluminum bromide catalyst. In the practice of our invention, the catalyst may be employed in amounts ranging from about 0.1% to 10% or more by weight. However, in some instances more than the minimum amount of catalyst may be employed to insure practical yields.

Reactions representative of the process of our invention wherein ethyl derivatives are employed are as follows:

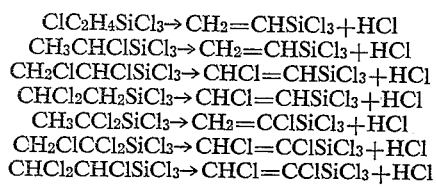

$$ClC_2H_4SiCl_3 \rightarrow CH_2=CHSiCl_3 + HCl$$
$$CH_3CHClSiCl_3 \rightarrow CH_2=CHSiCl_3 + HCl$$
$$CH_2ClCHClSiCl_3 \rightarrow CHCl=CHSiCl_3 + HCl$$
$$CHCl_2CH_2SiCl_3 \rightarrow CHCl=CHSiCl_3 + HCl$$
$$CH_3CCl_2SiCl_3 \rightarrow CH_2=CClSiCl_3 + HCl$$
$$CH_2ClCCl_2SiCl_3 \rightarrow CHCl=CClSiCl_3 + HCl$$
$$CHCl_2CHClSiCl_3 \rightarrow CHCl=CClSiCl_3 + HCl$$

The following examples more fully disclose our invention:

Example 1

A 150-gram mixture of beta-chloroethyl trichlorosilane (78 parts), alpha, alpha-dichloroethyl trichlorosilane (22 parts), and AlCl₃ (1 part) was charged to a 250-cc. flask attached to a column equipped with a still head. The column was ⅝ inch diameter by 20 inches long, and was packed with 3/32 inch glass helices, giving the equivalent of about a 12-plate column. The reactants were heated, and at about 80° C. evolution of gas (HCl) began. Heating was continued with reflux in the column until the head temperature dropped to 90° C., the boiling point of vinyl trichlorosilane. The take-off rate at the still head was adjusted so that it remained at about 90° C. for a period of 5 hours. 104 grams of product were removed at the still head during this time, which on fractionation gave 12 grams of silicon tetrachloride, 60 grams of vinyl trichlorosilane, 16.5 grams of alpha-chlorovinyl trichlorosilane, and 13 grams of beta-chloroethyl trichlorosilane.

Example 2

Using the same general procedure as the above example, with the exception that the product was recovered at a still head temperature of 115° C., two experiments were made differing in the amounts of catalyst used and the reaction time. These gave the following results:

| | | |
|---|---|---|
| Percent AlCl₃ catalyst | 1.0 | 0.5 |
| Reaction time, hours | 2½ | 4 |
| Products: | | |
| Silicon tetrachloride...........grams | 9.2 | 5.5 |
| Vinyl trichlorosilane...........do | 52.0 | 52.0 |
| Alpha-chlorovinyl trichlorosilane...do | 17.0 | 19.5 |
| Beta-chloroethyl trichlorosilane...do | 32.0 | 35.0 |
| Mol Ratio of $\dfrac{\text{Vinyl Derivatives}}{\text{SiCl}_4}$ | 7.7 | 13.2 |

Example 3

A mixture of beta-chloroethyl trichlorosilane and alpha, alpha-dichloroethyl trichlorosilane as in Example 1, in an amount of 150 grams, and 1.5 grams of AlCl₃ were charged to a 200-cc. round bottom flask. The flask was attached to a reflux condenser and the contents refluxed for 2.5 hours. During this period, the temperature of the reactants rose to 133° C., and slowly fell to 125° C. A small distillation column was then attached to the flask, and the contents rapidly distilled until the kettle temperature reached 250° C. 122.6 grams of product were recovered, which upon fractionation gave: silicon tetrachloride, 8 grams; vinyl trichlorosilane, 22 grams; alpha-chlorovinyl trichlorosilane, 14.5 grams; and unconverted starting material (B. P. 150° C.), 72.5 grams.

Example 4

With alpha-chloroethyl trichlorosilane as a starting material, experiments were made which give an indication of the amounts of catalyst necessary for suitable conversion to the vinyl derivative. 69 grams of the aforesaid compound and 0.1 gram of AlCl₃ (0.15% by weight) were refluxed for five hours at 124° to 129° C., and some, but not a significant amount of, vinyl trichlorosilane was found in the product. Using 3 grams AlCl₃ (2% by weight), 150 grams of alpha-chloroethyl trichlorosilane, and heating for 11½ hours at 135° C. in a small distillation column, the conversion to vinyl trichlorosilane was 48.6%, with 11.2% to silicon tetrachloride. In this experiment the vinyl trichlorosilane was removed at the still head as rapidly as formed. An AlBr₃ catalyst, in an amount of 2%, and under the same process conditions, gave essentially the same results.

Example 5

About 40 grams of alpha, alpha-dichloroethyl trichlorosilane were charged to a 200-cc. flask with 0.5 gram of AlCl₃. The flask was attached to a 5-plate column packed with glass helices and equipped with a still head. Upon heating the contents, a vigorous evolution of gas occurred, and as the decomposition proceeded, the low-boiling product was removed from the still head to a receiver. In ten minutes the conversion of the alpha, alpha-dichloroethyl trichlorosilane was complete. Analysis of the reaction product by distillation through a 12-plate column gave 25 grams of alpha-chlorovinyl trichlorosilane.

Example 6

About 256 grams of beta, beta-dichloroethyl trichlorosilane and 0.25 gram anhydrous AlCl₃ were charged to a 250-cc. round bottom flask. The flask was attached to a 5-plate column with a still head, and the contents were heated to reflux. A vigorous gas evolution was observed, and the liquid products were removed from the still head at such a rate that the head temperature was maintained between 130°–140° C. Fractionation of these products gave 180 grams of beta-chlorovinyl trichlorosilane and 62 grams of unreacted beta, beta-dichloroethyl trichlorosilane.

Example 7

In equipment similar to that of Example 6, 146 grams of alpha, beta-dichloroethyl trichlorosilane and 0.45 gram of anhydrous AlCl₃ were heated to reflux for a period of 45 minutes. During this period 112 grams of product boiling between 120° to 130° C. were removed from the still head. This product upon fractionation through a 12-plate column gave 106 grams of beta-chlorovinyl trichlorosilane and 4.6 grams unconverted alpha, beta-dichloroethyl trichlorosilane.

Example 8

The alpha-chloro derivative of diethyldichlorosilane (i. e., ethyl-alpha-chloroethyl dichlorosilane), mixed with 0.12% by weight of AlCl₃, was heated in a still kettle at a temperature of 160° C. The product formed was fractionated from a 25-plate column to give the following compounds:

| Product | Yield, Percent | Efficiency, Percent |
| --- | --- | --- |
| Ethyl trichlorosilane | 31.4 | 35.6 |
| Ethylvinyl dichlorosilane | 27.1 | 30.7 |

Example 9

136 grams of gamma-chloropropyl trichlorosilane and 0.25 gram (0.18%) of AlCl₃ were charged to a 250-cc. kettle equipped with a thermometer well. The whole was then connected to a 10-plate glass helices packed column designed to operate at reduced pressures. The pressure on the system was reduced and the reactants heated. Heating was continued with reflux in the column until the head temperature dropped to a 90° to 100° C. range at 440 mm./Hg. A total of 99 grams of product was obtained at the still head under these conditions. Fractionation of the product gave 80.2 grams of a mixture of allyl trichlorosilane and methylvinyl trichlorosilane, and 15.2 grams of gamma-chloropropyl trichlorosilane.

Example 10

75 grams of gamma-chloropropyl trichlorosilane and 0.1 gram of AlBr₃ were charged to a side arm distilling flask equipped with a condenser and receiver. The receiver was vented to a Dry-Ice trap, a gas sampling tube, and finally to the hood. The reactants were rapidly heated to refluxing and in a period of fifteen minutes all the volatiles (60 grams) were made to the receiver. The 60 grams of volatile products upon fractionation through a 12-plate column gave 14 grams of a mixture of allyl trichlorosilane and methylvinyl trichlorosilane and 43 grams of recovered gamma-chloropropyl trichlorosilane.

Example 11

186 grams of gamma-chloropropyl ethyl dichlorosilane and 0.2 gram AlCl₃ were charged to a 300-cc. flask equipped with a thermometer well. The whole was connected to a 12-plate column designed to operate at reduced pressure. The pressure on the system was reduced and the reactants heated so that reflux was obtained at the still head. The product distilling at a head temperature between 50°–60° C. at 100 mm./Hg was made to the receiver. Because the reaction proceeded so slowly at this temperature, the pressure was adjusted to 150 mm./Hg and the product distilled over a 5-hour period to the receiver. A total of 146 grams was made to the receiver and 17 grams of material was recovered in the cold trap. The cold trap condensate was combined with the distillate and the whole charged to a 20-plate column for careful fractionation, the results of which disclosed that 9.4 grams of ethyl allyl dichlorosilane, 8.35 grams of ethyl methylvinyl dichlorosilane, and 38.9 grams of gamma-chloropropyl trichlorosilane were obtained.

Example 12

In a 250-cc. flask connected to a fractionating column there were placed 192 grams of beta-chloropropyl trichlorosilane and 1 gram of anhydrous aluminum chloride. The mixture was heated at reflux under reduced pressure (100 mm.) for two hours, during which time hydrogen chloride was evolved and low-boiling material was removed from the column distilling from 50°–60° C. at 100 mm. At this point unreacted beta-chloropropyl trichlorosilane was also distilled. A total of 137 grams of distilled material and 22 grams of residue were obtained. Fractionation of the distilled material gave 28 grams of allyl trichlorosilane, 56 grams of methylvinyl trichlorosilane, and 51 grams of residue assumed to be recovered beta-chloropropyl trichlorosilane.

Example 13

In a flask connected to a fractionating column there were placed 150 grams of purified alpha-chloropropyl trichlorosilane and 0.5 gram of anhydrous aluminum chloride. The mixture was heated at reflux under a pressure of 200 mm. Although some reaction occurred at this pressure, it was found that reflux temperature at atmospheric pressure was necessary in order to obtain appreciable reaction. After refluxing for two hours, a total of 98.5 grams of material was collected distilling below 145° C. at atmospheric pressure. (This includes some alpha-chloropropyl trichlorosilane which distilled under reduced pressure.) The residue weighed 27 grams. Fractionation of the distilled material gave 9 grams of silicon tetrachloride, 11 grams of allyl trichlorosilane, 43 grams of methylvinyl trichlorosilane and 33.6 grams of residue assumed to be mainly recovered alpha-chloropropyl trichlorosilane.

Example 14

To a 250-cc. kettle attached to a column designed to operate at reduced pressure, there were charged 142 grams of 2,3-dichlorobutyl trichlorosilane and 0.2 gram aluminum chloride. The mixture was heated to 270° C. at 250 mm./Hg, at which temperature rapid dehydrochlorination occurred. In 3 hours, 115 grams of the product boiling at approximately 135° C./250 mm. Hg was made to the receiver. Fractionation of the product disclosed that 61.5 grams of 2-chloro-3-butenyl trichlorosilane and 24.1 grams of 2,3-dichlorobutyl trichlorosilane were obtained.

As the above examples indicate, some variation in the reaction conditions is possible, particularly insofar as the temperature and catalyst amounts are concerned. Heating at least to a reflux temperature appears necessary for suitable dehydrochlorination, but higher temperatures may occasionally be desirable. Although the catalysts may be employed in concentrations as low as about 0.1%, the preferred range will generally vary from about 0.5% to 3% by weight when reflux temperatures at atmospheric pressure are used. Larger amounts of catalyst and lower reflux temperatures as obtained at reduced temperatures may be employed.

The unsaturated silane derivatives which may be prepared by the process of this invention have many interesting and possible applications, particularly in the forming of siloxane polymers.

This application is a continuation-in-part application of our copending application Serial No. 112,838 filed August 27, 1949, now abandoned.

We claim:

1. A process for dehydrochlorinating a chloroalkylchlorosilane which comprises heating said chloroalkylchlorosilane in the presence of a Friedel-Crafts catalyst taken from the group consisting of aluminum chloride and aluminum bromide to a temperature at which hydrogen chloride is evolved from the chloroalkyl group thereof to produce the corresponding unsaturated chlorosilane.

2. A process for dehydrochlorinating a chloropropyltrichlorosilane which comprises heating said chloropropyltrichlorosilane in the presence of a Friedel-Crafts catalyst taken from the group consisting of aluminum chloride and aluminum bromide to a temperature at which hydrogen chloride is evolved from the chloropropyl group thereof to produce the corresponding unsaturated chlorosilane.

3. A process for dehydrochlorinating a chlorobutyltrichlorosilane which comprises heating said chlorobutyltrichlorosilane in the presence of a Friedel-Crafts catalyst taken from the group consisting of aluminum chloride and aluminum bromide to a temperature at which hydrogen chloride is evolved from the chlorobutyl group thereof to produce the corresponding unsaturated chlorosilane.

4. A process for dehydrochlorinating a chloroethyltrichlorosilane which comprises heating said chloroethyltrichlorosilane in the presence of a Friedel-Crafts catalyst taken from the group consisting of aluminum chloride and aluminum bromide to a temperature at which hydrogen chloride is evolved from the chloroethyl group thereof to produce the corresponding unsaturated chlorosilane.

5. A process for dehydrochlorinating a chloroalkylchlorosilane which comprises heating said chloroalkylchlorosilane in the presence of from about 0.1 per cent to 10 per cent by weight of said chloroalkylchlorosilane of a Friedel-Crafts catalyst taken from the group consisting of aluminum chloride and aluminum bromide to a temperature at which hydrogen chloride is evolved from the chloroalkyl group thereof to produce the corresponding unsaturated chlorosilane.

6. A process for dehydrochlorinating a chloroalkylchlorosilane which comprises heating said chloroalkylchlorosilane in the presence of from about 0.5 per cent to 3 per cent by weight of said chloroalkylchlorosilane of a Friedel-Crafts catalyst taken from the group consisting of aluminum chloride and aluminum bromide to a temperature at which hydrogen chloride is evolved from the chloroalkyl group thereof to produce the corresponding unsaturated chlorosilane.

7. A process for dehydrochlorinating a chloroalkylchlorosilane which comprises heating said chloroalkylchlorosilane in the presence of a Friedel-Crafts catalyst taken from the group consisting of aluminum chloride and aluminum bromide to its boiling temperature under conditions of partial reflux to evolve hydrogen chloride from the chloroalkyl group thereof and to distill the corresponding unsaturated chlorosilane.

8. A process for dehydrochlorinating a chloropropyltrichlorosilane which comprises heating said chloropropyltrichlorosilane in the presence of a Friedel-Crafts catalyst taken from the group consisting of aluminum chloride and aluminum bromide to its boiling temperature under conditions of partial reflux to evolve hydrogen chloride from the chloropropyl group thereof and to distill the corresponding unsaturated trichlorosilane.

9. A process for dehydrochlorinating a chlorobutyltrichlorosilane which comprises heating said chlorobutyltrichlorosilane in the presence of a Friedel-Crafts catalyst taken from the group consisting of aluminum chloride and aluminum bromide to its boiling temperature under conditions of partial reflux to evolve hydrogen chloride from the chlorobutyl group thereof and to distill the corresponding unsaturated trichlorosilane.

10. A process for dehydrochlorinating a chloroethyltrichlorosilane which comprises heating said chloroethyltrichlorosilane in the presence of a Friedel-Crafts catalyst taken from the group consisting of aluminum chloride and aluminum bromide to its boiling temperature under conditions of partial reflux to evolve hydrogen chloride from the chloroethyl group thereof and to distill the corresponding unsaturated trichlorosilane.

11. A process for dehydrochlorinating a chloroethylchlorosilane taken from the group consisting of monochloroethyltrichlorosilanes and dichloroethyltrichlorosilanes and monochloroethylethyldichlorosilanes which comprises heating said chloroethylchlorosilane in the presence of from about 0.5 per cent to 3 per cent by weight of said chloroethylchlorosilane of an aluminum chloride catalyst to its boiling temperature under conditions of partial reflux to evolve hydrogen chloride from the chloroethyl group thereof and to distill the corresponding unsaturated chlorosilane.

12. A process for dehydrochlorinating monochloroethyltrichlorosilane which comprises heating said monochloroethyltrichlorosilane in the presence of from about 0.5 per cent to about 3.0 per cent by weight of said monochloroethyltrichlorosilane of an aluminum chloride catalyst to a temperature of from about 130° C. to about 140° C. to evolve hydrogen chloride from the monochloroethyl group thereof and recovering the corresponding unsaturated trichlorosilane.

13. A process for dehydrochlorinating dichloroethyltrichlorosilane which comprises heating said dichloroethyltrichlorosilane in the presence of from about 0.5 per cent to about 3.0 per cent by weight of said dichloroethyltrichlorosilane of an aluminum chloride catalyst to a temperature of from about 130° C. to about 140° C. to evolve hydrogen chloride from the dichloroethyl group thereof and recovering the corresponding unsaturated trichlorosilane.

14. A process for preparing ethylvinyldichlorosilane which comprises heating ethyl-alpha-chloroethyldichlorosilane at a temperature of about 160° C. in the presence of aluminum chloride in an amount of from about 0.12% to 0.5% by weight and recovering ethylvinyldichlorosilane.

References Cited in the file of this patent

UNITED STATES PATENTS 2,512,390    Sommer _____ June 20, 1950
2,574,390    Hatcher _____ Nov. 6, 1951

OTHER REFERENCES

Sommer et al.: "Jour. Am. Chem. Soc.," vol. 70 (1948), pp. 2869–2872.

Sommer et al.: "Jour. Am. Chem. Soc.," vol. 71 (1949), pp. 3056–3060.